US012713417B2

(12) United States Patent
Panteleev et al.

(10) Patent No.: US 12,713,417 B2
(45) Date of Patent: Aug. 18, 2026

(54) HARQ FEEDBACK FOR DYNAMIC AND SEMI-PERSISTENT RECEPTION

(71) Applicant: Intel Corporation, Santa Clara, CA (US)

(72) Inventors: Sergey Panteleev, Maynooth (IE); Debdeep Chatterjee, San Jose, CA (US); Fatemeh Hamidi-Sepehr, San Jose, CA (US); Toufiqul Islam, Santa Clara, CA (US); Salvatore Talarico, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 18/280,999

(22) PCT Filed: Apr. 5, 2022

(86) PCT No.: PCT/US2022/023472

§ 371 (c)(1),
(2) Date: Sep. 8, 2023

(87) PCT Pub. No.: WO2022/216701

PCT Pub. Date: Oct. 13, 2022

(65) Prior Publication Data

US 2024/0147453 A1 May 2, 2024

Related U.S. Application Data

(60) Provisional application No. 63/171,402, filed on Apr. 6, 2021.

(51) Int. Cl.
*H04W 72/11* (2023.01)
*H04L 1/1829* (2023.01)
(Continued)

(52) U.S. Cl.
CPC ........... *H04W 72/11* (2023.01); *H04L 1/1854* (2013.01); *H04L 5/14* (2013.01); *H04W 72/21* (2023.01)

(58) Field of Classification Search
CPC ................................ H04L 12/28; H04L 12/50
(Continued)

(56) References Cited

U.S. PATENT DOCUMENTS 12,402,023 B2 * 8/2025 Zhou ..................... H04L 5/0057
2016/0157218 A1 * 6/2016 Nam .................... H04B 7/0639 370/329
2021/0021382 A1 1/2021 Chien

FOREIGN PATENT DOCUMENTS

CN 105009499 A 10/2015
JP 2016515351 5/2016
(Continued)

OTHER PUBLICATIONS

"International Application Serial No. PCT/US2022/023472, International Search Report mailed Jul. 6, 2022", 3 pgs.
(Continued)

*Primary Examiner* — Dang T Ton
(74) *Attorney, Agent, or Firm* — Schwegman Lundberg & Woessner, P.A.

(57) ABSTRACT

An apparatus and system for deferring hybrid automatic repeat request (HARQ) feedback for semi-persistent scheduling (SPS) physical downlink shared channel (PDSCH) transmissions in a time-domain duplexing (TDD) system are described. After an SPS PDSCH configuration indicating that deferral of the SPS HARQ feedback is enabled is received, a user equipment (UE) determines whether a PUCCH associated with a particular SPS PDSCH transmission is able to be transmitted on valid uplink (UL) symbols. The PUCCH carries a SPS HARQ-ACK bits to acknowledge the particular SPS PDSCH transmission. If the PUCCH
(Continued)

is unable to be transmitted using the timing of the SPS PDSCH configuration, the transmission is deferred until the next valid occasion on which the PUCCH is able to be transmitted.

20 Claims, 6 Drawing Sheets

(51) Int. Cl.
*H04L 5/14* (2006.01)
*H04W 72/21* (2023.01)

(58) Field of Classification Search
USPC ........................ 370/329, 401, 402, 403, 405
See application file for complete search history.

(56) References Cited

FOREIGN PATENT DOCUMENTS

| | | | |
|---|---|---|---|
| JP | 2021501513 | | 1/2021 |
| WO | WO-2019211916 | A1 | 11/2019 |
| WO | WO-2020197195 | A1 | 10/2020 |
| WO | WO-2022216701 | A1 | 10/2022 |

OTHER PUBLICATIONS

"International Application Serial No. PCT/US2022/023472, Written Opinion mailed Jul. 6, 2022", 4 pgs.
"Moderator summary #1 on HARQ-ACK feedback enhancements for NR Re1-17 URLLC/IIoT (AI 8.3.1.1)", Moderator (Nokia), R1-2009566, 3GPP TSG RAN WG1 Meeting #103-e, e-Meeting, (Nov. 5, 2020), 86 pgs.
Nokia, et al., "HARQ-ACK feedback enhancements for URLLC/IIoT", R1-2008842, 3GPP TSG RAN WG1 Meeting #103-e, e-Meeting, (Nov. 1, 2020), 20 pgs.
"U.S. Appl. No. 18/280,999, Supplemental Preliminary Amendment filed May 10, 2024", 7 pages.
"Japanese Application Serial No. 2023-560114, Notification of Reasons for Refusal mailed Mar. 18, 2025", w English translation, 16 pgs.
Asia Pacific Telecom, "Discussion on UE feedback enhancements for HARQ-ACK", 3GPP TSG RAN WG1 #104-e R1-2100968, [Online]. Retrieved from the Internet: URL:https: www.3gpp.org ftp tsg_ranAVGI_RLI TSGRI_104-e Docs R1-2100968.zip, (Jan. 19, 2021), 6 pgs.
CAICT, "UE feedback enhancements for HARQ-ACK", 3GPP TSG RAN WG1 #104-e R1-2100302, [Online]. Retrieved from the Internet: URL:https: www.3gpp.org ftp tsg_ranAVGI_RLI TSGRI_104-e Docs RI-2100302.zip, (Jan. 18, 2021), 6 pgs.
NTT Docomo, Inc, "Discussion on HARQ-ACK feedback enhancements for Rel. 17 URLLC", 3GPP TSG RAN WG1 #104-e R1-2101612, [Online]. Retrieved from the Internet: URL: https: "www. 3 gpp. org ftp tsg_ranAVG1RL 1 TSGR1104-e Docs R 1-2101612. zip.
RAN2, "Enhanced Industrial Internet of Things (IoT) and ultra-reliable and low latency communication (URLLC)", 3GPP TSG RAN #91e RP-210262, [Online]. Retrieved from the Internet: URL:https: www.3gpp.org ftp tsg_ran TSG_RAN TSGR_9 le Docs RP-210262,zip, (Mar. 12, 2021), 14 pgs.
Shanghai, Bell, "Maintenance of Rel-16 URLLC IIoT SPS enhancements", 3GPP TSG RAN WG1 #100_e R1-2000407, [Online]. Retrieved from the Internet: URL:https: www.3gpp.org ftp tsg_ranAVGI_RLI TSGRI_100_e Docs R1-2000407.zip, (Feb. 14, 2020), 6 pgs.
Vivo, "Other issues for URLLC and UE features", 3GPP TSG RAN WG1 #99 R1-1912037, [Online]. Retrieved from the Internet: ?URL: https: www.3 gpp. org ftp tsg_ranAV GIRL1 TSGR1_99 Doc s R1-1912037. zip, (Nov. 9, 2019), 12 pgs.
"Japanese Application Serial No. 2023-560114, Response filed Jun. 17, 2025 to Notification of Reasons for Refusal mailed Mar. 18, 2025" w/ English Claims 11 pgs.
"Japanese Application Serial No. 2023-560114, Notification of Reasons for Refusal mailed Sep. 9, 2025", w/ English Translation, 13 pgs.
"Japanese Application Serial No. 2023-560114, Response filed Dec. 3, 2025 to Notification of Reasons for Refusal mailed Sep. 9, 2025", W/English Claims, 10 pgs.

* cited by examiner

HARQ FEEDBACK FOR DYNAMIC AND SEMI-PERSISTENT RECEPTION

PRIORITY CLAIM

This application is a U.S. National Stage Filing under 35 U.S.C. 371 from International Application No. PCT/US2022/023472, filed Apr. 5, 2022 and published in English as WO 2022/216701 on Oct. 13, 2022, which claims the benefit of priority to U.S. Provisional Patent Application 63/171,402, filed Apr. 6, 2021, each of which is incorporated herein by reference in its entirety.

TECHNICAL FIELD

Embodiments pertain to next generation (NG) wireless communications. In particular, some embodiments relate to semi-persistent scheduling (SPS) hybrid automatic repeat request (HARQ) feedback transmission.

BACKGROUND

The use and complexity of new radio (NR) wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
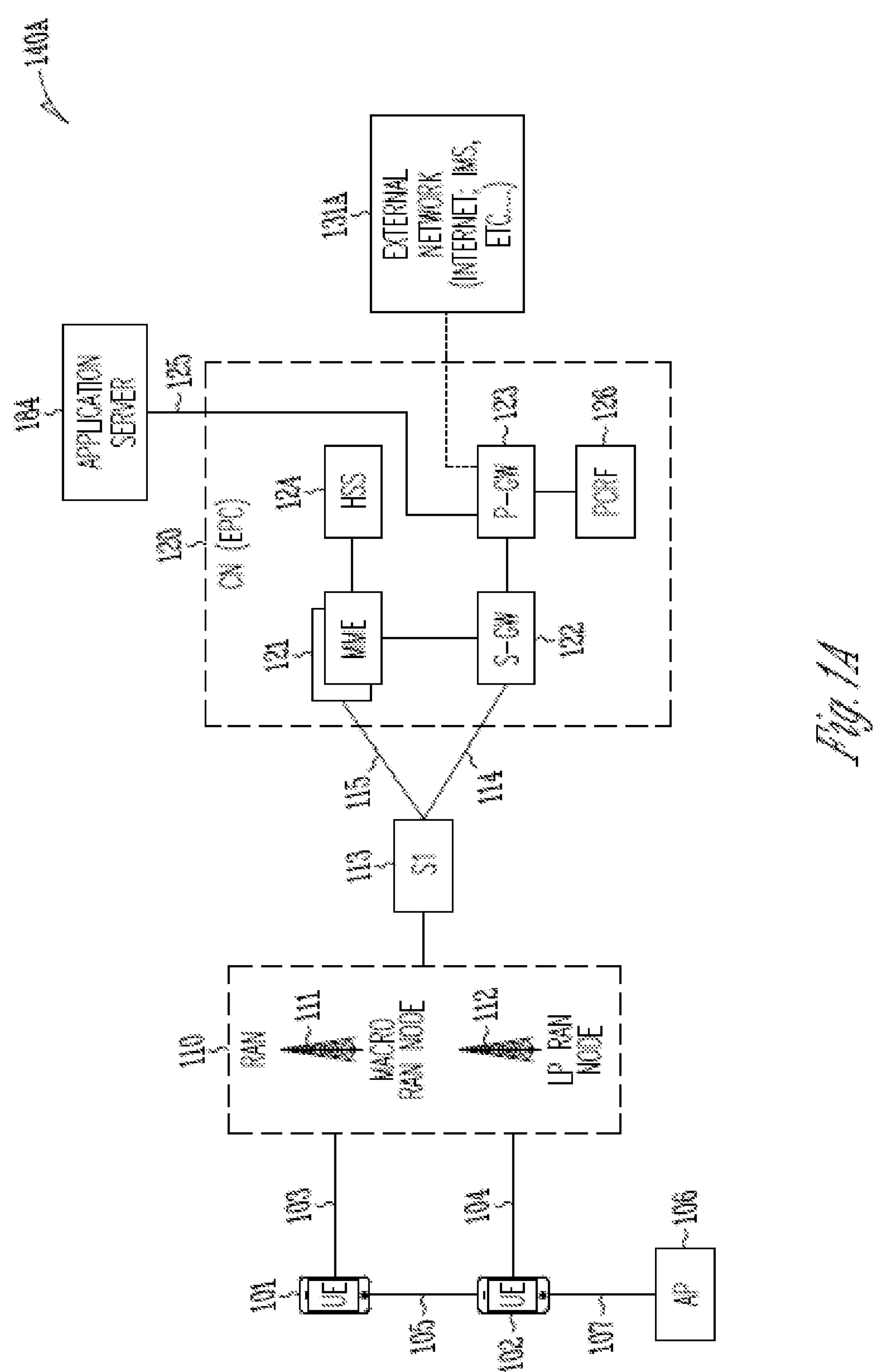
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS)

Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation ($5^{th}$ or $6^{th}$ generation) NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
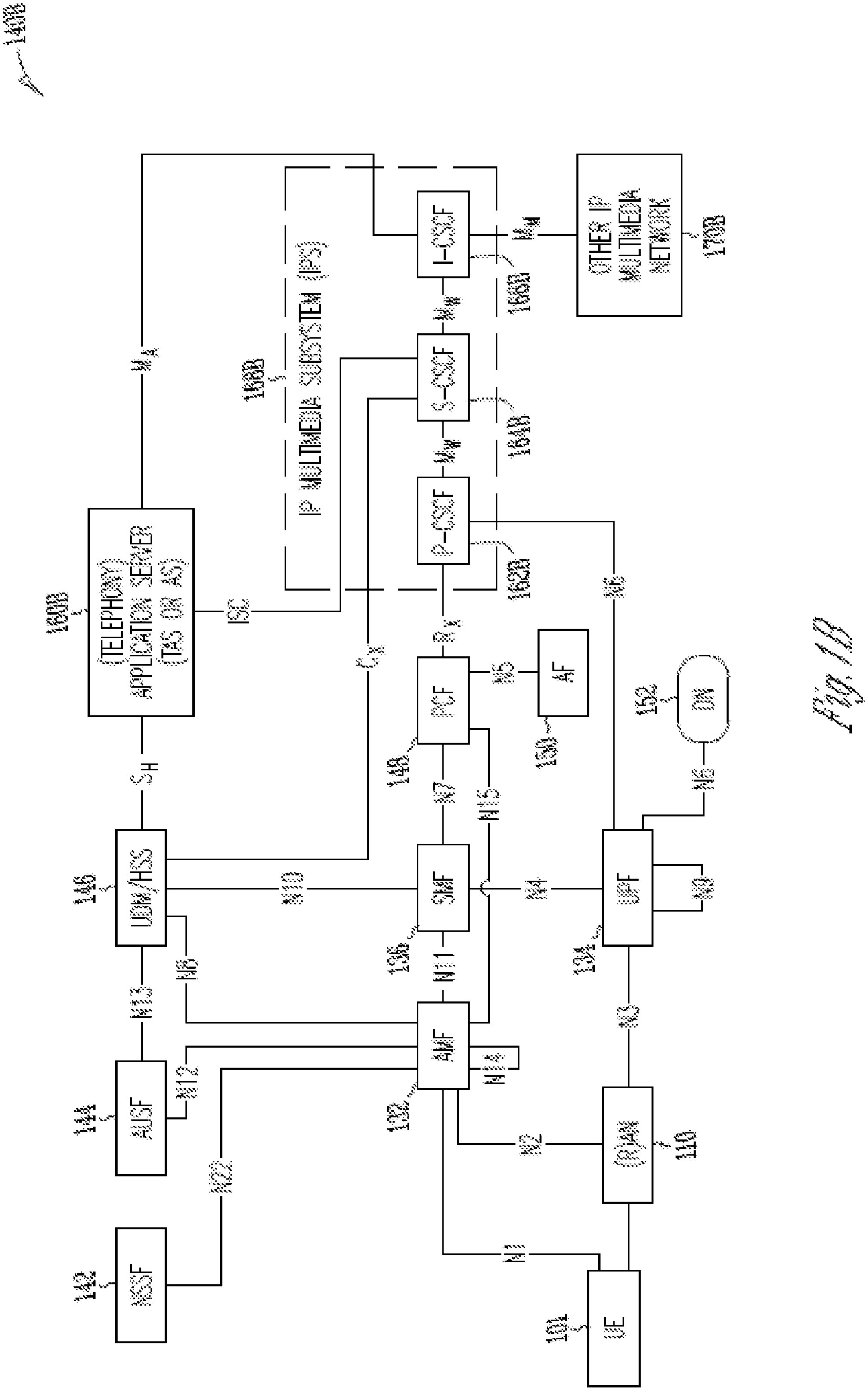
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMF s, not shown), and N22 (between AMF 132 and NSSF 142, not shown). Other reference point representations not shown in FIG. 1B can also be used.

Figure 1C:
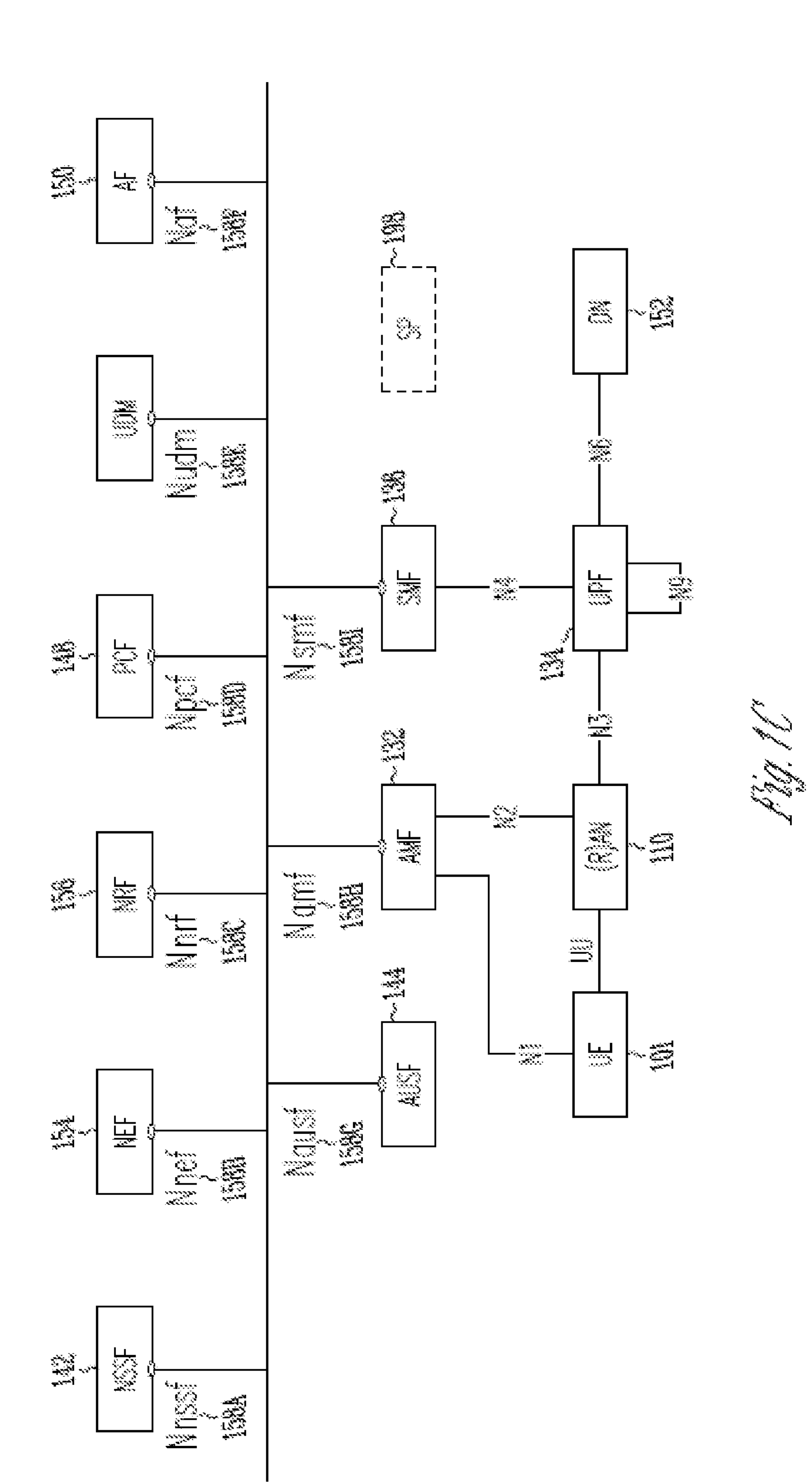
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
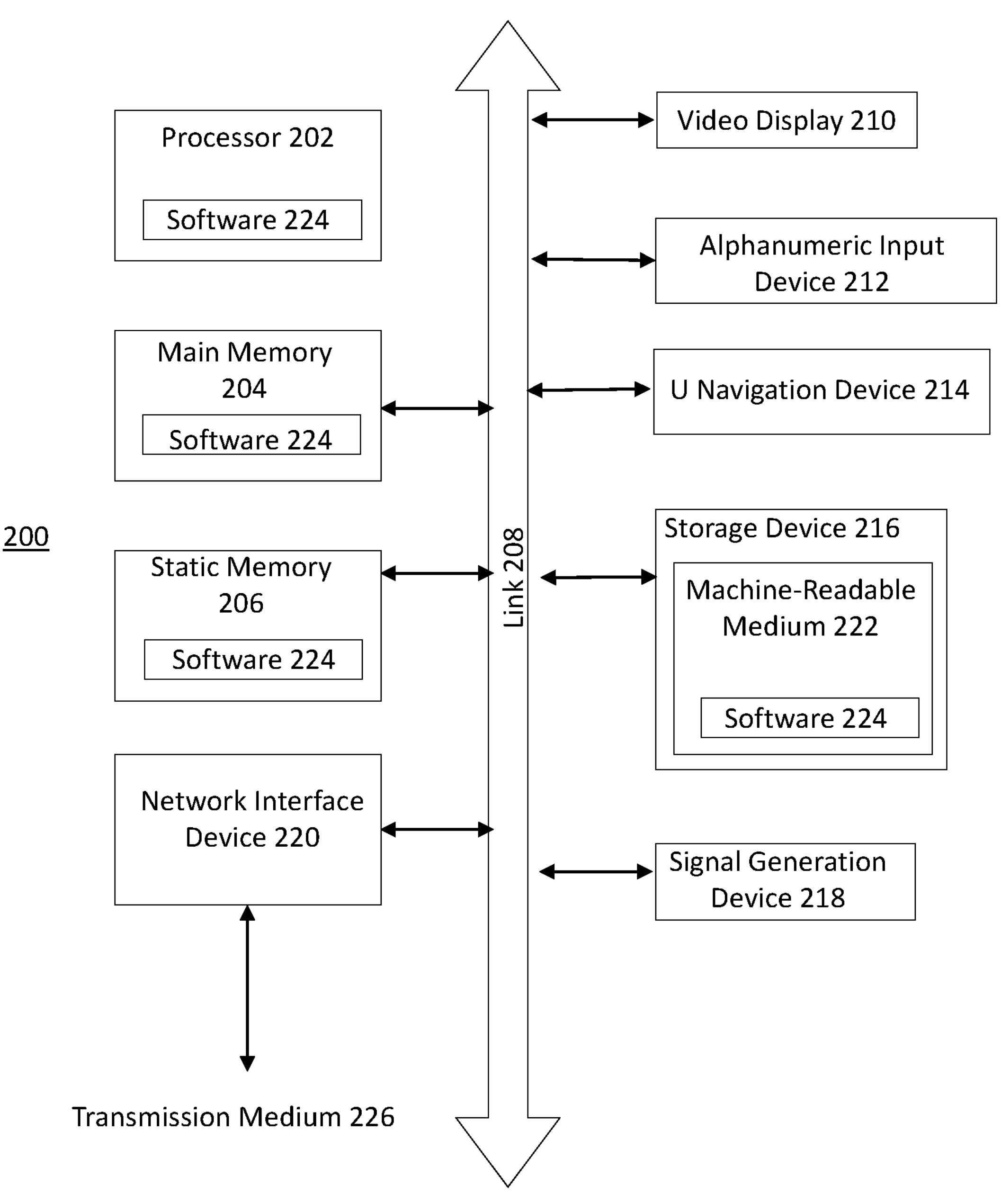
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925

MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, with the advent of NR, the achievable latency and reliability performance of the NR system have been extended from the 4G system to support use cases with tighter requirements. In order to extend the NR applicability in various verticals, Rel-16 NR evolved to support use cases including the Release 15 enabled use case improvements include augmented reality/virtual reality (AR/VR) and Release 16 use cases with higher requirements include factory automation, transport industry uses, and electrical power distribution. In Rel. 17, the NR technology is to be enhanced to support Ultra-Reliable Low Latency Communication (URLLC) and Industrial Internet-of-Things (IIoT) has started. One of the objectives is to enhance HARQ feedback from a UE.

In particular, Rel-17 enhancements are desired to configure the system to avoid acknowledgment of the SPS physical downlink shared channel transmission (SPS HARQ ACK) dropping for time-domain duplexing (TDD) systems due to PUCCH collision with at least one downlink (DL) or flexible symbol. Additional enhancements include SPS HARQ skipping for 'skipped' SPS physical downlink shared channel (PDSCH) transmissions, PUCCH repetition enhancements (at least for HARQ-ACK), e.g., sub-slot based, retransmission of cancelled HARQ transmissions, SPS HARQ payload size reduction and/or skipping for 'non-skipped' SPS PDSCH transmissions, type 1 HARQ codebook implementation based on a sub-slot PUCCH configuration, and PUCCH carrier switching for HARQ feedback. Accordingly, determining whether a deferral condition for a potential PUCCH (also referred to herein as a hypothetical PUCCH) has occurred, and SPS configuration order handling for deferral are described herein.

One of the issues identified for Rel. 17 is reducing the dropping of SPS HARQ-ACK transmissions due to collision with symbols designated for DL transmissions that are semi-statically or dynamically configured. In Rel. 15, it was assumed that the uplink (UL) resources for HARQ-feedback information could be properly provisioned by the gNB considering single SPS configuration per bandwidth part and 10 ms minimum SPS periodicity. However, in Rel. 16, the DL SPS procedures were enhanced with multiple concurrent DL SPS configurations (up to 8) and shorter periodicities (down to 1 slot), making provisioning of SPS HARQ-ACK feedback resources challenging without relying on potential PUCCH dropping.

Potential solutions for this issue include postponing the feedback(s) to the next valid occasion, which does not result in dropping, and retransmission of the dropped feedback. In some embodiments, while the postponing/deferring of feedback to the next valid occasion may be desirable, multiple details are still open.

Condition that a SPS-HARQ is to be Deferred

Figure 3:
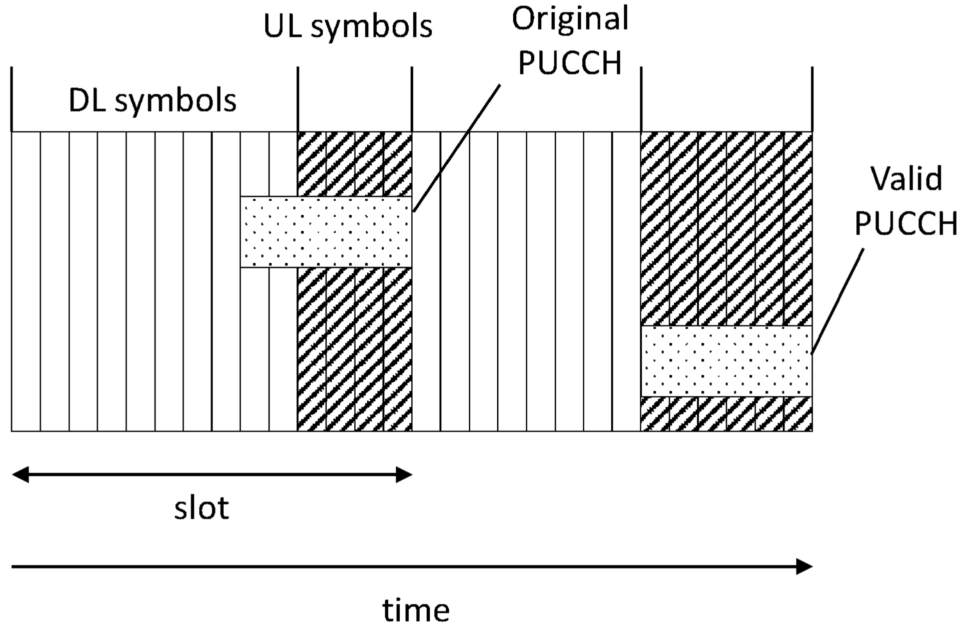
FIG. 3 illustrates a physical uplink control channel (PUCCH) with deferred SPS HARQ ACK in accordance with some aspects.

There are two different high-level approaches:

Approach 1: SPS HARQ-ACK deferring timing can be calculated semi-statically, thus does not depend on dynamic changes in scheduled uplink channel information (UCI). This approach may be viewed in the specification as a semi-static recalculation of K1 values for each PDSCH occasion. The UE may utilize its processing capabilities when the UE determines the slot/sub-slot for HARQ reporting right after SPS activation. On average, this approach can defer a smaller number of feedback transmissions compared to dynamic deferring. FIG. 3 illustrates a PUCCH with deferred SPS HARQ ACK in accordance with some aspects. In particular, the original semi-persistent PUCCH transmission is unable to be transmitted and is thus delayed to a time that a valid PUCCH is able to be transmitted.

Approach 2: SPS HARQ-ACK deferring timing can be calculated from both semi-static conditions and dynamic triggers. In this case, the dynamic deferring may, on average, result in a larger number of non-dropped feedback transmissions. However, this approach should take into account UE processing timelines that are used to re-consider PUCCH/UCI construction based on dynamic deferring. In case of missed DCIs, the UE and gNB may not agree on the slot/sub-slot to be used for the deferral.

Although Approach 2 could potentially handle more collision cases, its complexity and potential impact due to missed DCIs may be problematic in some embodiments. Accordingly, the deferral of SPS HARQ-ACK may be known exclusively semi-statically. It then follows that multiplexing with other dynamically scheduled UCI should not be considered when deciding to defer the feedback. To avoid dynamic conditions in the deferral process, the specification may thus rely only on checking the possibility to transmit an SPS HARQ-ACK without multiplexing with other dynamic UCI.

In this case, various solutions can be considered. In a first embodiment, in one embodiment, the UE determines that an SPS HARQ-ACK bit is to be deferred to a next valid occasion. This may be based on the UE determining that a potential PUCCH carrying the SPS HARQ-ACK bit cannot be mapped to valid UL symbols of a slot/sub-slot pointed by the current value of k1_current, where k1_current is an initial or a modified k1 value (i.e., the slot/sub-slot time gap between a scheduled PDSCH and corresponding UCI carrying the HARQ-ACK), and the modification of k1 value by incrementing the k1 value by 1 happens in case the potential PUCCH cannot be mapped.

The potential PUCCH may be one or more of various alternatives. In a first option, any PUCCH may be used that is indicated by n1PUCCH-AN or SPS-PUCCH-AN-r16 for a particular maximum payload size. n1PUCCH-AN is the PUCCH resource defined for SPS transmission for a single SPS configuration. SPS-PUCCH-AN-r16 is the list of PUCCH resources defined for multiple SPS configurations. The parameters n1PUCCH-AN and SPS-PUCCH-AN-r16 may be provided in the PUCCH-ConfigCommon information element in higher layer signaling, such as system information block2 (SIB2) or reconfiguration signaling used for the RRC connection.

In a variation of the first option, the UE can assume an actual number of SPS HARQ-ACK bits when determining the potential PUCCH resource from the PUCCH resource set. In another variation of the first option, the UE can assume the SPS HARQ-ACK transmission is X bits, where X may be configured or determined by the UE based on the deferred SPS HARQ-ACK feedback.

In a second option, any PUCCH may be used that is indicated by n1PUCCH-AN or SPS-PUCCH-AN-r16 or PUCCH-ResourceSet for a particular maximum payload size. In a variation of the second option, the UE can assume the SPS HARQ-ACK transmission is X bits, where X may be configured or determined by the UE. In another variation of the second option, the UE can assume an actual number of SPS HARQ-ACK bits and a potential number Y of other UCI bits when considering the PUCCH-ResourceSet, where the potential number Y of other UCI bits may be configured by radio resource control (RRC) signaling or pre-defined in the specification.

In a third option, a newly configured separate set of PUCCH resources for the SPS HARQ-ACK with enabled deferring may be used. In this case, when deferring is enabled, the UE utilizes the separately configured PUCCH resource set for deferred SPS HARQ-ACK transmission. In a variation of the third option, the UE can assume the SPS HARQ-ACK transmission is X bits, where X may be configured by the network or determined by the UE based on the process of deferring. In another variation of the third option, the UE can assume that the SPS HARQ-ACK transmission is only 1 bit, or may assume an actual number of SPS HARQ-ACK bits laying into the slot/sub-slot according to the current iteration of the deferring procedure.

In a third option, the potential PUCCH is not explicitly considered, and the number of "L" valid UL symbols in the slot/sub-slot may be provided separately by the gNB. If the number of valid UL symbols in the slot/sub-slot indicated by k1_current is smaller than the pre-determined or configured by RRC value of L symbols, then the UE determines that the SPS HARQ is to be deferred for this slot/sub-slot.

The deferral process for different SPS HARQ feedback transmissions may be considered either independently or jointly. In one embodiment, the UE does not expect the SPS PUCCH configuration for a given deferred payload of M bits will exceed the maximum payload associated with the provided PUCCH configurations. Alternatively, when the maximum payload exceeds the configured value for the SPS HARQ-ACK transmission, the UE further defers the last-added SPS HARQ-ACK bit.

Related to the above embodiments, the potential PUCCH resource set may also include PUCCH resources in another component carrier. This may occur by configuring the UE accordingly with PUCCH resources on multiple component carriers. In one example, if no PUCCH resource can be mapped in a first carrier, the UE is expected to test the potential of mapping the PUCCH in a second carrier.

Sequence of Deferring

When there are multiple SPS feedback transmissions for deferring consideration, additional rules may be used on how the deferring should be performed. Assume that for a configuration T, there are PDSCH occasions in slots {i_n, i_n+p, i_n+2*p, etc}. For each of the PDSCH occasions, the SPS HARQ feedback may be subject to deferral.

In one example, a UE is not expected to defer feedback for a first, earlier SPS PDSCH occasion i_n to a slot/sub-slot n+k1_deferred_1, to a slot/sub-slot after feedback for a second, later PDSCH occasion i_n+p, i.e., n+k1_deferred_1 is not expected to be larger than n+p+k1 deferred 2.

In another example, when a UE is configured with multiple SPS configurations, with a first configuration 'i' in occasions {i_n, i_n+p1, i_n+2*p1, etc.} and a second configuration T in occasions {j_n, j_n+p2, j_n+2*p2, etc.}, the UE may not be expected to defer a feedback of any of an earlier SPS PDSCH occasion among two configurations to a slot/sub-slot later than a deferred feedback for any of a later SPS PDSCH occasion among two configurations.

In yet another example, any M SPS HARQ-ACK bits for M SPS configurations with enabled deferring which are multiplexed in the same UCI before the deferring are expected to be multiplexed in the same UCI after the deferring. When a UE considers a given SPS HARQ feedback transmission to be deferred, to determine the UCI payload size and code block (CB) size, the UE considers the corresponding SPS PDSCH occasions in ascending order of configuration index and slot/sub-slot index within a window.

Figure 4:
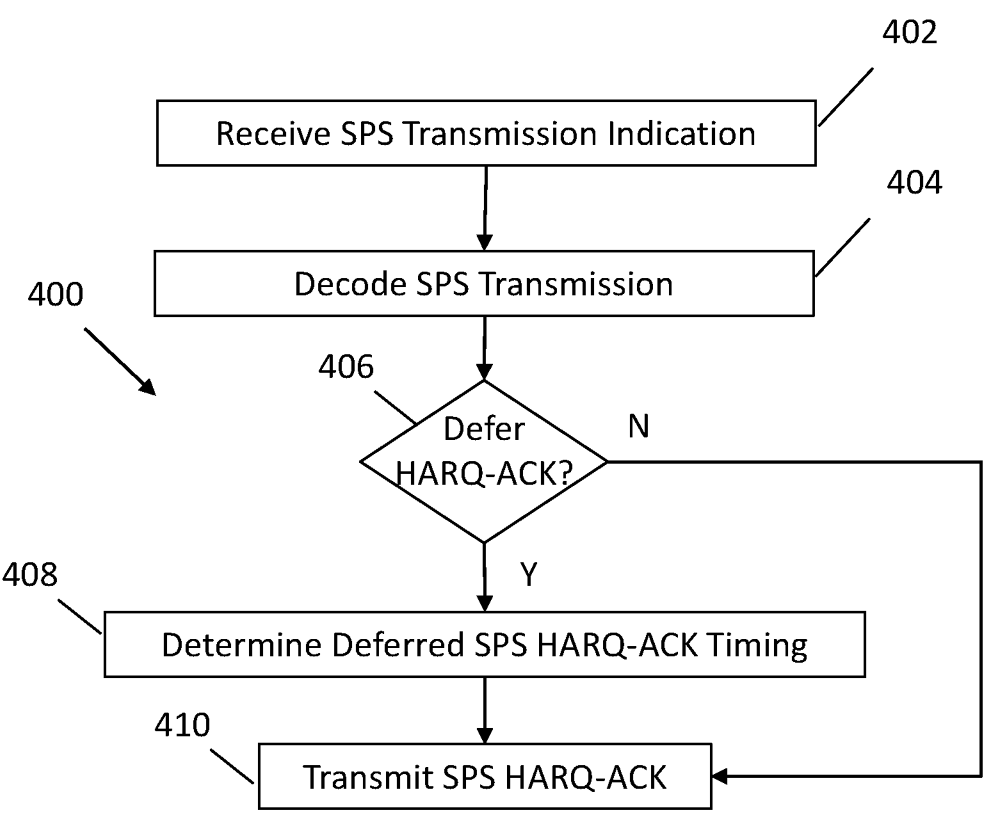
FIG. 4 illustrates a flowchart of SPS HARQ-ACK transmission in accordance with some aspects.

Accordingly, FIG. 4 illustrates a flowchart of SPS HARQ-ACK transmission in accordance with some aspects. In the method 400 of FIG. 4, the UE may receive a message indicating SPS PDSCH transmissions at operation 402. The message may be, for example, a SIB, RRC signaling, or PDCCH (or PDSCH) that contains a DCI with the information. Thus, the gNB may configure the UE with an SPS PDSCH configuration indicating that HARQ feedback postponing is enabled. The gNB also configures the UE with a nominal PDSCH-to-HARQ feedback time gap (the time between the scheduled PDSCH and a corresponding UCI carrying the SPS HARQ-ACK). At operation 404, the UE may receive one or more of the SPS PDSCH transmissions scheduled by the message. At operation 406, the UE determines whether the SPS HARQ-ACK transmission for the one or more SPS transmissions is to be deferred. That is, the UE then determines whether a potential PUCCH carrying SPS HARQ feedback can be transmitted on valid UL symbols using the nominal PDSCH-to-HARQ feedback time gap. If so, the UE determines the timing to transmit the deferred SPS HARQ-ACK transmission(s) at operation 408. At operation 410, the UE transmits the SPS HARQ-ACK transmission at the appropriate timing with or without deferment as appropriate and thus independent of whether the SPS HARQ-ACK transmission has been deferred. That is, the UE may defer transmission of the SPS HARQ feedback to a next valid occasion in response to a determination that the potential PUCCH cannot be mapped on valid UL symbols.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising:

processing circuitry configured to:

decode, from a $5^{th}$ generation NodeB (gNB), a message activating semi-persistent scheduling (SPS) physical downlink shared channel (PDSCH) receptions for time-domain duplexing (TDD) operation;

decode, from the gNB, an indication that deferring of a SPS hybrid automatic repeat request acknowledgment (HARQ-ACK) information bit is enabled;

determine that a physical uplink control channel (PUCCH) resource for a PUCCH transmission with the SPS HARQ-ACK information bit for a particular SPS PDSCH reception to be reported for a first time overlaps with a downlink resource; and in response to a determination that the PUCCH resource overlaps with the downlink resource, defer transmission of the SPS HARQ-ACK information bit to an earliest slot after the PUCCH resource; and a memory configured to store the SPS HARQ-ACK information bit.

2. The apparatus of claim 1, wherein the processing circuitry is configured to decode, from the gNB, a radio resource control (RRC) signal containing a SPS-PUCCH-AN-List information element (IE) that indicates the PUCCH resource.

3. The apparatus of claim 1, wherein the processing circuitry is configured to decode, from the gNB, a radio resource control (RRC) signal containing a n1PUCCH-AN information element (IE) that indicates the PUCCH resource.

4. The apparatus of claim 1, wherein the processing circuitry is configured to multiplex HARQ-ACK information bits, which include the SPS HARQ-ACK information bit, for transmission in another PUCCH transmission in the earliest slot after the PUCCH resource.

5. The apparatus of claim 4, wherein the SPS HARQ-ACK information bits correspond to SPS PDSCH configurations in which deferral is enabled.

6. The apparatus of claim 5, wherein for transmission of the other PUCCH transmission, the processing circuitry is configured to determine the earliest slot among slots corresponding to the SPS PDSCH configurations.

7. The apparatus of claim 1, wherein the processing circuitry is configured to decode, from the gNB, a radio resource control (RRC) signal containing an information element (IE) that configures a maximum payload size for the PUCCH resource.

8. The apparatus of claim 1, wherein the processing circuitry is configured to determine the PUCCH transmission from any PUCCH transmission indicated by n1PUCCH-AN or SPS-PUCCH-AN-r16 for a particular maximum payload size, where n1PUCCH-AN is a PUCCH resource for SPS transmission for a single SPS configuration and SPS-PUCCH-AN-r16 is a list of PUCCH resources for multiple SPS configurations.

9. The apparatus of claim 8, wherein the processing circuitry is configured to assume an actual number of HARQ-ACK information bits to determine PUCCH resources of the PUCCH transmission from a PUCCH resource set.

10. The apparatus of claim 1, wherein the processing circuitry is configured to:

determine that a plurality of PUCCH transmissions associated with different SPS PDSCH transmissions are each unable to be transmitted in a respective valid UL occasion and that a respective SPS HARQ ACK information bit for each of the SPS PDSCH transmissions is to be deferred; and retain, after deferral, an order of the SPS HARQ ACK information bits among the SPS PDSCH transmissions prior to deferral.

11. The apparatus of claim 1, wherein the processing circuitry is configured to:

decode, from the gNB, a plurality of SPS PDSCH configurations indicating that deferral of SPS HARQ ACK information bits is enabled; and for each of the SPS PDSCH configurations:

determine that a plurality of PUCCH transmissions associated with different SPS PDSCH transmissions of the SPS PDSCH configuration are each unable to be transmitted in a respective valid UL occasion and that a respective HARQ ACK information bit for each of the SPS PDSCH transmissions is to be deferred;

retain, after the deferral, an order of the SPS HARQ ACK information bits for the SPS PDSCH transmissions of the SPS PDSCH configuration prior to deferral; and retain, after the deferral, an order of the SPS HARQ ACK information bits among the SPS PDSCH configurations prior to deferral.

12. The apparatus of claim 1, wherein the processing circuitry is configured to:

decode, from the gNB, a plurality of SPS PDSCH configurations indicating that deferral of SPS HARQ ACK information bits is enabled;

multiplex SPS HARQ ACK information bits of SPS PDSCH transmissions of the plurality of SPS PDSCH configurations in uplink control information (UCI); and retain, after deferral, an order of the multiplexed SPS HARQ ACK information bits in the UCI prior to deferral.

13. An apparatus for a $5^{th}$ generation NodeB (gNB), the apparatus comprising:

processing circuitry configured to:

encode, to a user equipment (UE), a message activating semi-persistent scheduling (SPS) physical downlink shared channel (PDSCH) receptions for time-domain duplexing (TDD) operation;

encode, for transmission to the UE, an indication that deferring of a SPS hybrid automatic repeat request acknowledgment (HARQ-ACK) information bit is enabled; and decode, from the UE, a physical uplink control channel (PUCCH) transmission that contains the SPS HARQ-ACK information bit, the PUCCH transmission deferred from a PUCCH resource for a particular SPS PDSCH reception to be reported for a first time that overlaps with a downlink resource to an earliest slot after the PUCCH resource; and a memory configured to store the SPS HARQ-ACK information bits.

14. The apparatus of claim 13, wherein the processing circuitry is configured to encode, for transmission to the UE, a radio resource control (RRC) signal containing at least one of a SPS-PUCCH-AN-List information element (IE) or n1PUCCH-AN IE that indicates the PUCCH resource.

15. The apparatus of claim 13, wherein the HARQ-ACK information bits include multiplexed HARQ-ACK information bits that correspond to SPS PDSCH configurations in which deferral is enabled.

16. A non-transitory computer-readable storage medium that stores instructions for execution by one or more processors of a user equipment (UE), the one or more processors configured to, when the instructions are executed:

decode, from a fifth generation NodeB (gNB), an indication that deferring of a SPS hybrid automatic repeat request acknowledgment (HARQ-ACK) information bit is enabled;

determine that a physical uplink control channel (PUCCH) resource for a PUCCH transmission with the SPS HARQ-ACK information bit for a particular SPS PDSCH reception to be reported for a first time overlaps with a downlink resource; and in response to a determination that the PUCCH resource overlaps with the downlink resource, defer transmission of the SPS HARQ-ACK information bit to an earliest slot after the PUCCH resource.

17. The non-transitory computer-readable storage medium of claim 16, wherein the one or more processors are configured to, when the instructions are executed, decode, from the gNB, a radio resource control (RRC) signal containing at least one of a SPS-PUCCH-AN-List information element (IE) or n1PUCCH-AN IE that indicates the PUCCH resource.

18. The non-transitory computer-readable storage medium of claim 16, wherein the one or more processors are configured to, when the instructions are executed, multiplex HARQ-ACK information bits, which include the SPS HARQ-ACK information bit, for transmission in another PUCCH transmission in the earliest slot after the PUCCH resource.

19. The non-transitory computer-readable storage medium of claim 18, wherein the SPS HARQ-ACK information bits correspond to SPS PDSCH configurations in which deferral is enabled.

20. The non-transitory computer-readable storage medium of claim 19, wherein for transmission of the other PUCCH transmission, the one or more processors are configured to, when the instructions are executed, determine the earliest slot among slots corresponding to the SPS PDSCH configurations.

* * * * *